United States Patent [19]

Newton

[11] 4,164,128

[45] Aug. 14, 1979

[54] ABSORPTION REFRIGERATION SYSTEM AND CONTROL

[75] Inventor: Alwin B. Newton, York, Pa.

[73] Assignee: Borg-Warner Corporation, Chicago, Ill.

[21] Appl. No.: 839,478

[22] Filed: Oct. 4, 1977

[51] Int. Cl.² ............................................. F25B 15/00
[52] U.S. Cl. ........................................ 62/105; 62/148; 62/209
[58] Field of Search .................. 62/105, 148, 185, 209

[56] References Cited

U.S. PATENT DOCUMENTS

| | | | |
|---|---|---|---|
| 3,195,318 | 7/1965 | Miner | 62/148 |
| 3,426,548 | 2/1969 | Greacen et al. | 62/148 X |
| 3,895,499 | 7/1975 | Hopkins | 62/148 X |

Primary Examiner—William E. Wayner
Attorney, Agent, or Firm—Thomas B. Hunter

[57] ABSTRACT

An absorption refrigeration system is adapted to be powered by solar energy or a source of relatively low temperature waste heat. A control system automatically adjusts the maximum energizing temperature as the temperature of the cooling water, used to cool the condenser and absorber coils, varies.

6 Claims, 4 Drawing Figures

ABSORPTION REFRIGERATION SYSTEM AND CONTROL

BACKGROUND OF THE INVENTION

1. Field of the Invention

Absorption refrigeration systems capable of efficient operation using solar energy or some other low temperature waste heat source.

2. Description of the Prior Art

In U.S. Pat. No. 3,895,449 issued to N. E. Hopkins on July 22, 1975, there is described an absorption refrigeration system in which the cooling tower water is essentially uncontrolled and allowed to vary as influenced by the temperature of the ambient air flowing through the cooling tower in contact with the water spray devices. In the Hopkins system, the heat input to the generator is controlled in response to the entering or leaving chilled water temperature as is conventional in absorption machines. The basic concept involved with the Hopkins system is a means for transferring solution from one point to another to prevent dangerous operating conditions.

SUMMARY OF THE INVENTION

In a typical closed circuit, continuous cycle absorption refrigeration system, a liquid chilled in an evaporator is circulated to a refrigeration load, such as one or more remotely located air conditioning terminal units, or a cooling system for an industrial process. The refrigerant vaporized in the evaporator passes to an absorber for absorption by a hygroscopic brine solution having a strong affinity for the refrigerant. The absorbent solution is thereby diluted, and the heat of solution is removed by circulating a cooling medium in a cooling coil provided in the absorber. The dilute solution is heated in a generator to evaporate refrigerant, the resulting concentrated solution being returned to the absorber. The evaporated refrigerant passes to a condenser where the heat of evaporation is abstracted by a cooling medium circulated in a condenser coil, and the condensate so formed is returned to the evaporator where it is circulated in a refrigerant circuit by means of a refrigerant pump. Water is frequently used as the refrigerant, the chilled fluid and the cooling media, and the source of heat in the generator is usually steam or hot water circulated in a heating coil. When the refrigerant is water, the absorbent solution is typically a hygroscopic brine such as an aqueous solution of lithium bromide or lithium chloride. As is well known, however, a large number of fluids with widely varying characteristics may be used in absorption refrigeration systems.

The absorber cooling coil is connected in a cooling circuit which usually also includes the condenser coil conveniently connected in series with the cooling coil. The cooling water is conducted from the condenser coil to a remotely located cooling tower where the heat abstracted in the absorber and in the condenser is rejected to ambient air. Alternatively, and where feasible, the cooling water may be drawn from a body of water such as a lake, a stream, an artificial pool or a deep well, and returned directly or indirectly thereto, the body of a water thus forming a portion of the cooling circuit.

The temperature of the cooling water must be so related to the temperature of the ambient air as to provide a favorable heat transfer relationship. Since refrigeration requirements are usually greatest during periods of high ambient temperatures, absorption refrigeration systems are customarily designed to be operated with correspondingly high cooling water temperature, and it has generally been considered necessary for stable operation of the system to provide controls which act to maintain these temperatures within a narrow critical range despite diurnal and seasonal variations in the ambient temperature.

For the most efficient operation of an absorption machine which has essentially uncontrolled cooling tower water temperature, the heat input or energizing temperature should be varied to maintain an optimum path of operation. Most absorption machines simply monitor the heat input in accordance with chilled water temperature and take no account of the condensing temperature or the absorbing temperature through which cooling tower water is transferred for cooling purposes.

The present invention proposes to monitor the cooling tower water temperature and adjust the maximum energizing temperature in accordance with an optimum program to obtain the greatest efficiency of operation. This permits the system to operate from solar heated water or from water heated by another source of relatively low temperature waste heat. It will be appreciated that a solar collector can collect considerably more thermal energy at lower temperatures, such as 140° F., than it can at higher temperatures, such as 200° F. A system which can utilize a relatively low temperature energizing medium thus makes solar energy quite practical in marginal areas. The invention, however, is not limited to an absorption machine powered by solar energy.

DETAILED DESCRIPTION OF THE INVENTION

Figure 1:
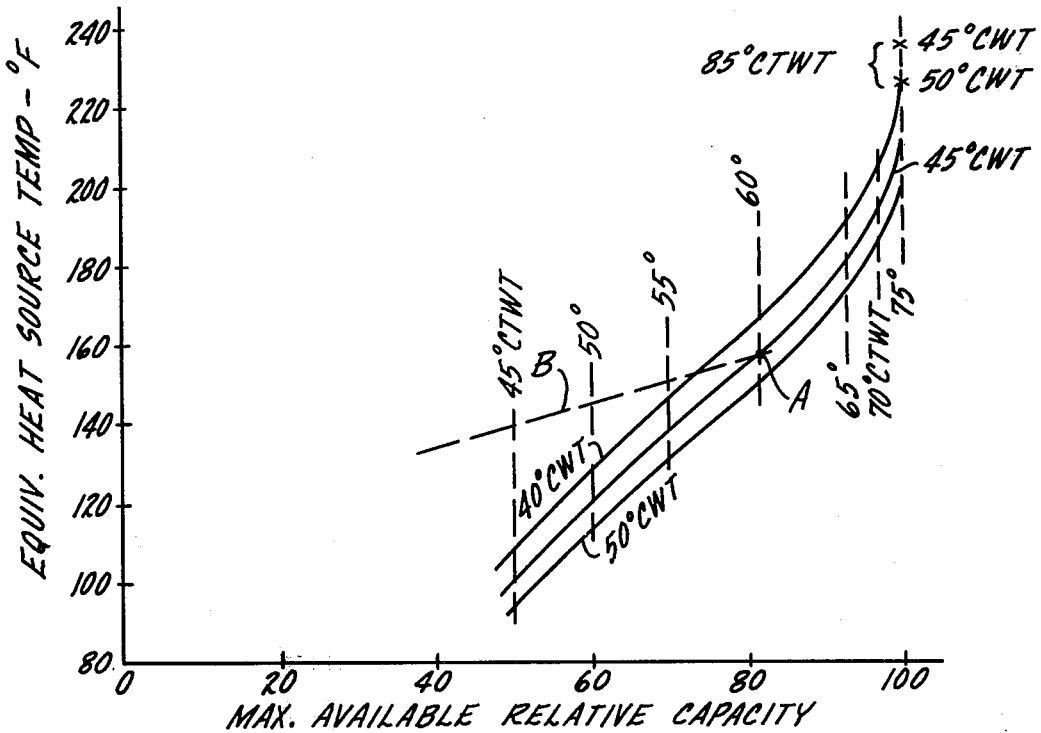
FIG. 1 is a graph illustrating the equivalent heat source temperature on the Y axis plotted against the maximum available relative capacity on the X axis. This has been displayed for different chilled water temperatures and for different cooling tower water temperatures.

The purpose of FIG. 1 is to show the minimum energizing temperature for various operating conditions in an absorption machine. Most absorption systems are provided with controls on the cooling tower water, usually a three-way bypass valve and a temperature sensor on the line delivering cooling tower water from the cooling tower. At the set point of the control system, usually about 75° F., the bypass is brought into operation so that the cooling tower water temperature is maintained at or above 75° even though the outdoor ambient (web bulb) temperature could drop well below 75° F.

In the present invention, no controls are applied to the cooling tower water supply so that the temperature thereof is a function of whatever ambient wet bulb temperature exists at any time. When the temperature of the cooling tower water drops, however, there is a practical maximum energizing temperature which should be used to avoid carryover of strong solution in the generator to the condenser. When the energizing temperature is too high, this combination of high energizing temperatures and low cooling tower water temperatures results in very high vapor velocities which entrain the solution and contaminate the refrigerant. The contamination of the refrigerant (water) by the brine drastically reduces the efficiency of such systems.

In FIG. 1, the vertical lines at spaced intervals represent the cooling tower water temperature (CTWT) in the system. The conventional absorption system, which always maintains cooling tower water above 75° F., operates along the 100% maximum available capacity line with energizing temperatures above 200° F. This is because most systems were originally designed to utilize waste heat; and the typical temperature of waste heat sources is about 240° F. However, it can be seen from the plots that the maximum energizing temperature should be lowered as the cooling tower water temperature is reduced. For purposes of explanation, there are three plots shown in FIG. 1 for chilled water temperatures (CWT) of 40° F., 45° F., and 50° F. respectively. To determine the maximum energizing temperature, one needs only to know the cooling tower water temperature and the desired chilled water temperature. For example, assume that the system is going to be operated with 60° F. cooling tower water and 45° F. chilled water is desired. The intersection of these two lines at point A dictates a maximum energizing temperature of approximately 158° F. This corresponds to a maximum relative capacity of 82%. If the load should drop further from this operating point, the system should track the dashed line shown at B in order to maintain the desired chilled water temperature. In other words, if the system was in balance at Point A, and then the load was reduced, the chilled water temperature would start to decrease. In order to maintain the chilled water temperature at the desired 45° F., the energizing temperature should be further reduced in accordance with the trace along line B. This will be described in greater detail below in connection with the control features.

Figure 2:
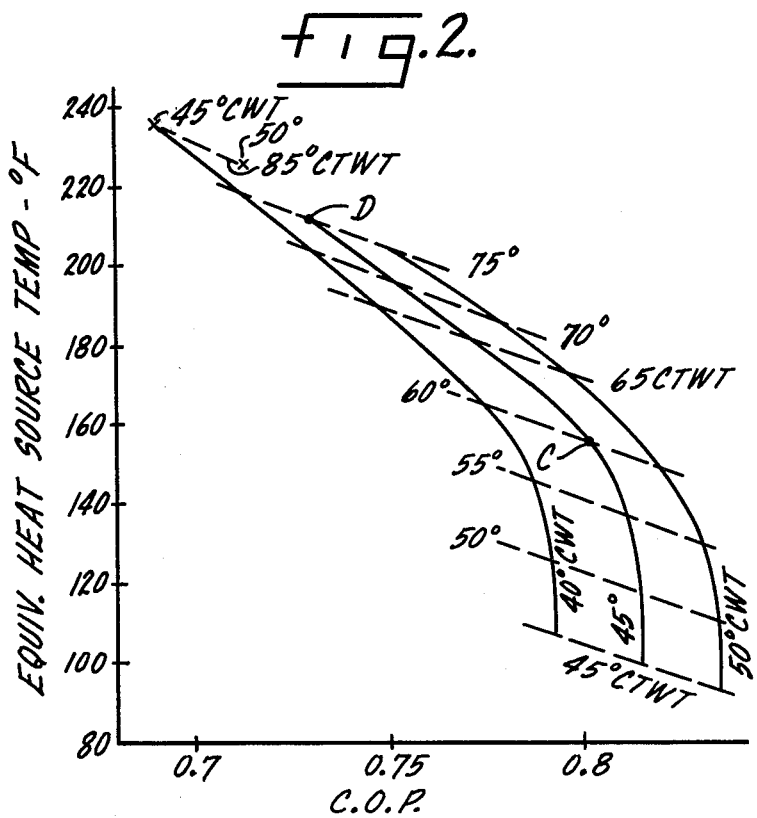
FIG. 2 is a graph illustrating the equivalent heat source temperature on the Y axis plotted against the Coefficient of Performance (C.O.P.) on the X axis. This also has been plotted for various chilled water and cooling tower water temperatures.

Referring to FIG. 2, this shows the Coefficient of Performance (C.O.P.) along the X axis and the maximum energizing temperature along the Y axis. Again taking the operating condition referred to above, i.e. 158° F. energizing temperature, 45° F. chilled water temperature and 60° F. cooling tower water temperature (as indicated at Point C), this corresponds to a C.O.P. of approximately 0.81. Compare this to a system in which the cooling tower water was maintained 75° F. or above with corresponding chilled water desired at 45° F. This point, designated at D, requires an energizing temperature of 212° F. and has a corresponding C.O.P. of 0.73, indicating a considerable loss of efficiency.

Figure 3:
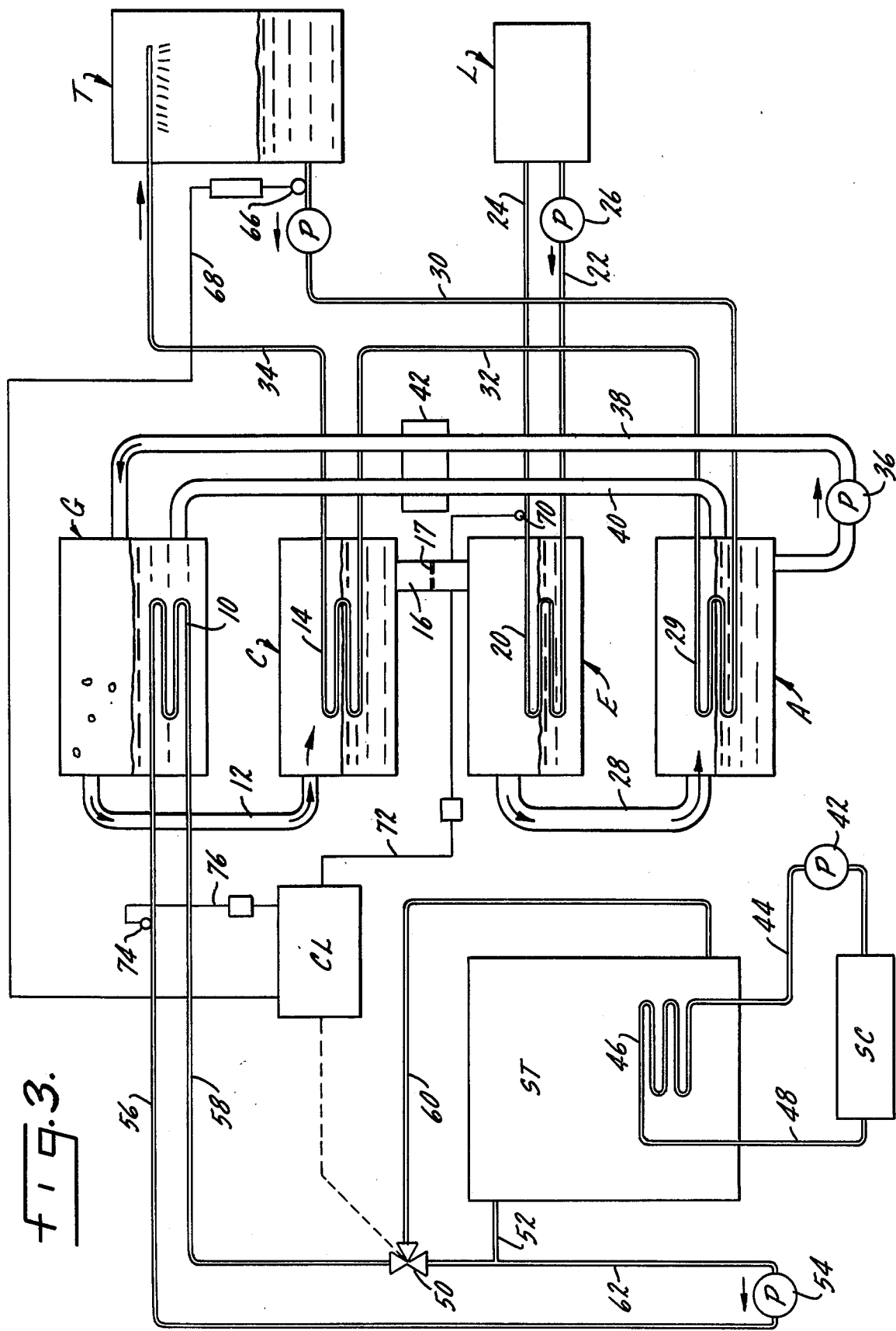
FIG. 3 is a schematic diagram of an absorption refrigeration system embodying the principles of the present invention.

FIG. 3 shows, in schematic form, an absorption refrigeration system constructed in accordance with the principles of the present invention. The generator G has a heat exchanger 10 supplied with a heated fluid as described in more detail below. Vapor released in the generator flows through line 12 to a condenser C having a heat exchanger 14 supplied with cooling tower water from tower T. The vapor condenses the heat exchanger, collects in the bottom of the condenser and flows through line 16 to the evaporator E. Line 16 has an orifice plate or other restriction 17 to maintain a desired pressure differential between the evaporator and the condenser.

The evaporator has a heat exchanger 20, sometimes referred to as the "chilled water coil", which is connected to the air-conditioning load L by way of supply line 22 and return line 24. A heat exchange fluid (usually water, but sometimes brine or ethylene glycol etc.) is pumped to and from the load by pump 26.

The vapor released in the evaporator flows through line 28 to the absorber A. A heat exchanger 29 is provided in the absorber which is also supplied with cooling tower water from cooling tower T. The circuit for the cooling tower water is through supply line 30 into heat exchanger 29 and then through line 32 to the condenser heat exchanger 14. Water is returned to the cooling tower from heat exchanger 14 through line 34 which connects with a spray header in the upper portion of the cooling tower.

The water vapor in the absorber is rapidly absorbed in the "thirsty" hygroscopic brine, such as lithium bromide or lithium chloride. This causes the absorbent solution to become more dilute and thus diminishes its hygroscopic properties. It is necessary, therefore, to transfer the dilute solution to the generator. This is done by means of a pump 36 which circulates the dilute solution back to the generator G through line 38.

When the water is boiled out of the brine in the generator, this solution becomes more concentrated; and this concentrated solution is transferred to the absorber through line 40. It is common to provide a heat exchanger 42 which transfers heat from the relatively hot concentrated solution in the generator to the entering stream of dilute, relatively cooler solution being transferred from the absorber to the generator. It will be appreciated that the conventional absorption system includes many features not shown in FIG. 3. For example, a refrigerant recirculating system sprays refrigerant over the chilled water coil; means are provided for recirculating an intermediate strength solution in the absorber; the condenser and generator are usually contained in a single shell as are the evaporator and absorber. However, none of these features has relevance to the operation of the simplified system described.

For the purpose of heating the generator heat exchanger 10 any suitable primary source of relatively low temperature thermal energy may be employed such as, for example, solar energy. Solar collector SC supplies hot water by means of a line 44 to a heat exchanger 46 in a storage tank ST. Water is returned to the solar collector through line 48 and is recirculated by means of a pump 42.

The heated water supplied to the generator heat exchanger 10 from the storage tank ST can be controlled by the operation of a three-way proportional control valve 50. Water from the storage tank enters the supply circuit through line 52 and is pumped by pump 54 through line 56 to the heat exchanger 10. Water returning from the generator through line 58 may be directed by the valve 50 back to the storage tank through line 60 or bypass the tank directly to the inlet side of pump 54 through line 62. The ratio of water flow returned to storage for reheating to the water flow bypassing the storage tank effectively controls the temperature of the water delivered to the generator heat exchanger 10. If a lower energizing temperature is desired, valve 50 is adjusted to send more water through line 62 and a corresponding decreased flow through line 60. If an increase in energizing temperature is needed, more water is returned to the tank through line 60 and therefore more of the higher temperature water in the tank flows into the supply circuit through line 52. The total flow (gpm) through the pump 54 remains constant.

An important aspect of the invention concerns the control features which automatically maintain the proper relationship between the hot water being supplied to the generator and such other conditions as the cooling tower water temperature and the temperature of the chilled water supplied to the load. A central control logic unit CL obtains a first input from the cooling tower water circuit by means of a sensor 66 on line 30 (or on line 34). This information is transmitted by a conductor 68 to the control logic CL. A second input is provided by sensor 70 sensing the leaving (or entering) chilled water temperature of the fluid being supplied to the load through line 24. This information is transmitted to the control unit through line 72. A third input includes a sensor 74 which is adapted to sense the temperature of the water delivered to the generator heat exchanger 10 through line 56 and transfer this information to the control unit via line 76.

Figure 4:
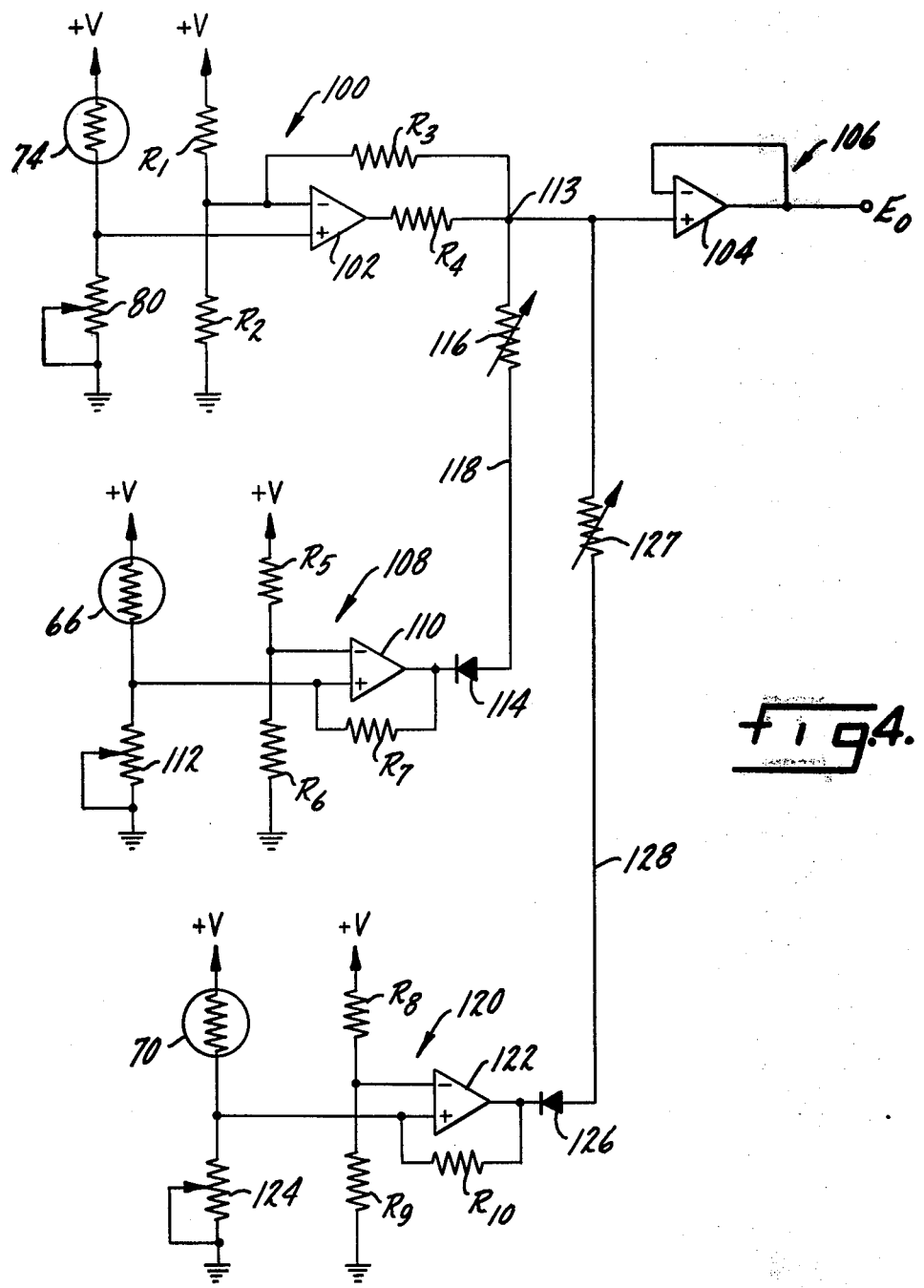
FIG. 4 is a simplified circuit diagram illustrating a portion of the control circuit used to select the proper temperature fluid as the generator heat input.

In FIG. 4 there is shown a typical analog control circuit for modifying the operation of the system in response to variables such as energizing temperature, chilled water temperature and cooling tower water temperature. Although the control may be effected by any known control means, such as mechanical, pneumatic etc., a preferred system uses a solid state electronic circuit employing thermistors as the sensors described above.

Thermistor 74 is located on the supply side of the generator heat exchanger line 56. A second thermistor 66 is adapted to sense the temperature of the cooling tower water and a third thermistor 70 senses the temperature of chilled water being supplied to the load from the evaporator coil 70. The analog control circuit 100 which incorporates thermistor 74 has an electrical output which is proportional to the temperature of the energizing fluid and is capable of being set by potentiometer 80 to some predetermined proportionality constant. An integrated circuit (IC) 102, connected as an operational amplifier, has an output which is fed to IC 104 connected as a buffer stage 106. The resistance values of $R_1$, $R_2$, $R_3$ and $R_4$ are selected for the energizing voltages and signal voltage levels in the specific circuit.

The output voltage is then employed to operate the control valve 50 which bypasses a certain amount of heating fluid to maintain the temperature of the fluid supplied to the generator at the desired temperature. For example, if the temperature of the heating fluid should rise above the desired control point, as sensed by thermistor 74, then the voltage at $E_0$ would increase and cause control valve 50 to begin bypassing a certain amount of fluid instead of returning it to the storage tank via line 60.

A first Schmitt trigger circuit 108, which incorporates thermistor 66 sensing the cooling tower water, is connected between the amplifier stage and the buffer stage of circuit 100. Integrated circuit 110 is connected as a Schmitt trigger in association with thermistor 66 and a potentiometer 112 which is adjustable to control the switching point. The output of IC 110 is connected to junction 113 through a diode 114, and potentiometer 116 by conductor 118. The circuit functions as follows: When the temperature of the cooling tower water is above, say about 75° F. then the conductor 118 and the variable resistance 116 is an open circuit because of the connection of diode 114. However, when the cooling tower water drops below 75° F. the resistance 116 is placed in parallel with the operation of analog control circuit 110 so that the output controlling the valve is modified. It therefore functions to reduce the energizing temperature in accordance with the desired program.

Still another feature of the invention is the use of the third thermistor sensing chilled water temperature. This thermistor 70 is operatively connected in a second Schmitt trigger circuit 120 including IC 122, potentiometer 124 and diode 127. Circuit 120 also is an open circuit when the chilled water temperature is above about 45° F. However, when the thermistor 70 senses a chilled water temperature below that said point, then the circuit "flips" and completes a circuit through the variable resistance 126 to ground via conductor 128. This introduces still another modification of the control ramp of the main energizing circuit, causing the energizing temperature to be reduced further in response to lowered chilled water temperature and thus will cause the operation of the system to follow line B in FIG. 1. The values of $R_5$–$R_{10}$, as in the case of $R_1$–$R_4$, are selected for the proper energizing and signal level voltages to match the system.

While this invention has been described in connection with a certain specific embodiment thereof, it is to be understood that this is by way of illustration and not by way of limitation; and the scope of the appended claims should be construed as broadly as the prior art will permit.

What is claimed is:

1. A control system for a closed circuit, continuous cycle absorption refrigeration machine of the type including a generator, a condenser, an absorber, an evaporator through which chilled water is circulated, means for supplying a heated fluid to said generator, and means for supplying a cooled fluid to said absorber and to said condenser, said control system comprising:

means for sensing the temperature of the heated fluid supplied to said generator;

means for sensing the temperature of said cooled fluid being supplied to said absorber and to said condenser;

a three-way proportional control valve adapted to modify the maximum energizing temperature of the heated fluid supplied to said generator in response to changes in the temperature of said cooled fluid as sensed by said cooled fluid temperature sensing means;

means for sensing the temperature of the chilled water circulated through the evaporator; and said control valve being adapted for further modifying the maximum energizing temperature of said heated fluid in response to changes in the temperature of said chilled water as sensed by said chilled water temperature sensing means.

2. A control system as defined in claim 1 including a cooling tower through which said cooled fluid is circulated, the temperature of said cooled fluid being a function of the wet bulb temperature of the ambient air.

3. Absorption refrigeration apparatus comprising:

a generator, a condenser, an absorber, and a evaporator all connected in a closed circuit, continuous cycle system;

means for supplying a heated fluid to said generator;

means for supplying a cooled fluid to said absorber and to said condenser;

means for sensing the temperature of the heated fluid supplied to said generator;

means for sensing the temperature of said cooled fluid being supplied to said absorber and to said condenser;

a three-way proportional control valve being adapted to modify the maximum energizing temperature of the heated fluid supplied to said generator in response to changes in the temperature of said cooled fluid as sensed by said cooled fluid temperature sensing means;

means for sensing the temperature of the chilled water circulated through the evaporator; and said control valve being adapted for further modifying the maximum energizing temperature of said heated fluid in response to changes in the temperature of said chilled water as sensed by said chilled water temperature sensing means.

4. Apparatus as defined in claim 3 including a cooling tower through which said cooled fluid is circulated, the temperature of said cooled fluid being a function of the wet bulb temperature of the ambient air.

5. A method of operating a closed circuit, continuous cycle absorption refrigeration machine of the type including a generator, a condenser, an absorber, an evaporator through which chilled water is circulated, means for supplying a heated fluid to said generator, and means for supplying a cooled fluid to said absorber and to said condenser comprising the steps of:

sensing the temperature of the heated fluid supplied to said generator;

sensing the temperature of said cooled fluid being supplied to said absorber and to said condenser;

adjusting a three-way proportional control valve to modify the maximum energizing temperature of the heated fluid supplied to said generator in response to changes as sensed in the step of sensing the temperature of said cooled fluid;

sensing the temperature of the chilled water circulated through the evaporator; and adjusting further the control valve for modifying the maximum energizing temperature of the heated fluid in response to changes as sensed in the step of sensing the temperature of the chilled water.

6. A method as defined in claim 5 including the step of circulating said cooled fluid through a cooling tower, the temperature of said cooled fluid being a function of the wet bulb temperature of the ambient air.

* * * * *